Feb. 9, 1943.  J. E. SMITH  2,310,325
ELECTRICAL HEATING UNIT
Filed Dec. 30, 1937  2 Sheets-Sheet 1
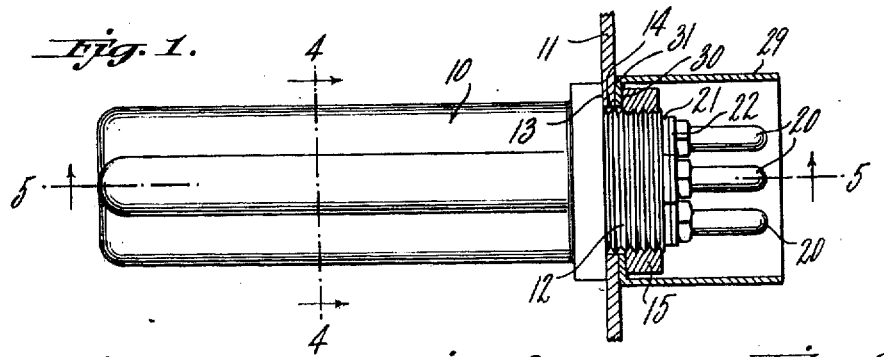
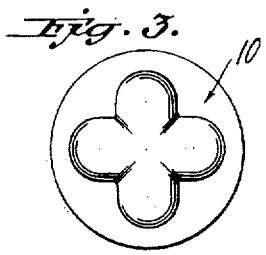
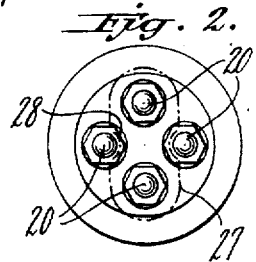
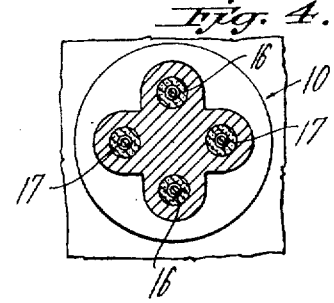
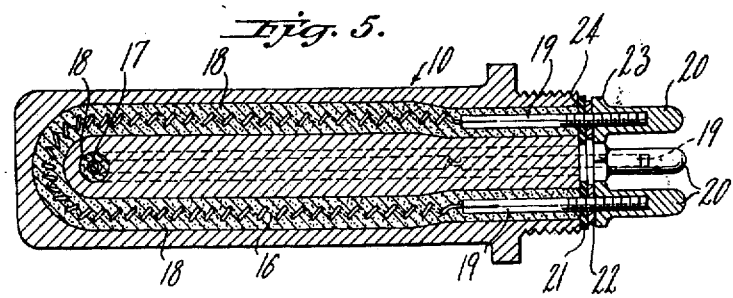
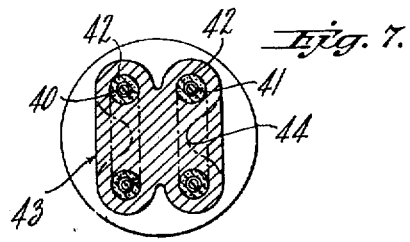
INVENTOR.
JOHN ERNEST SMITH
BY
ATTORNEY.

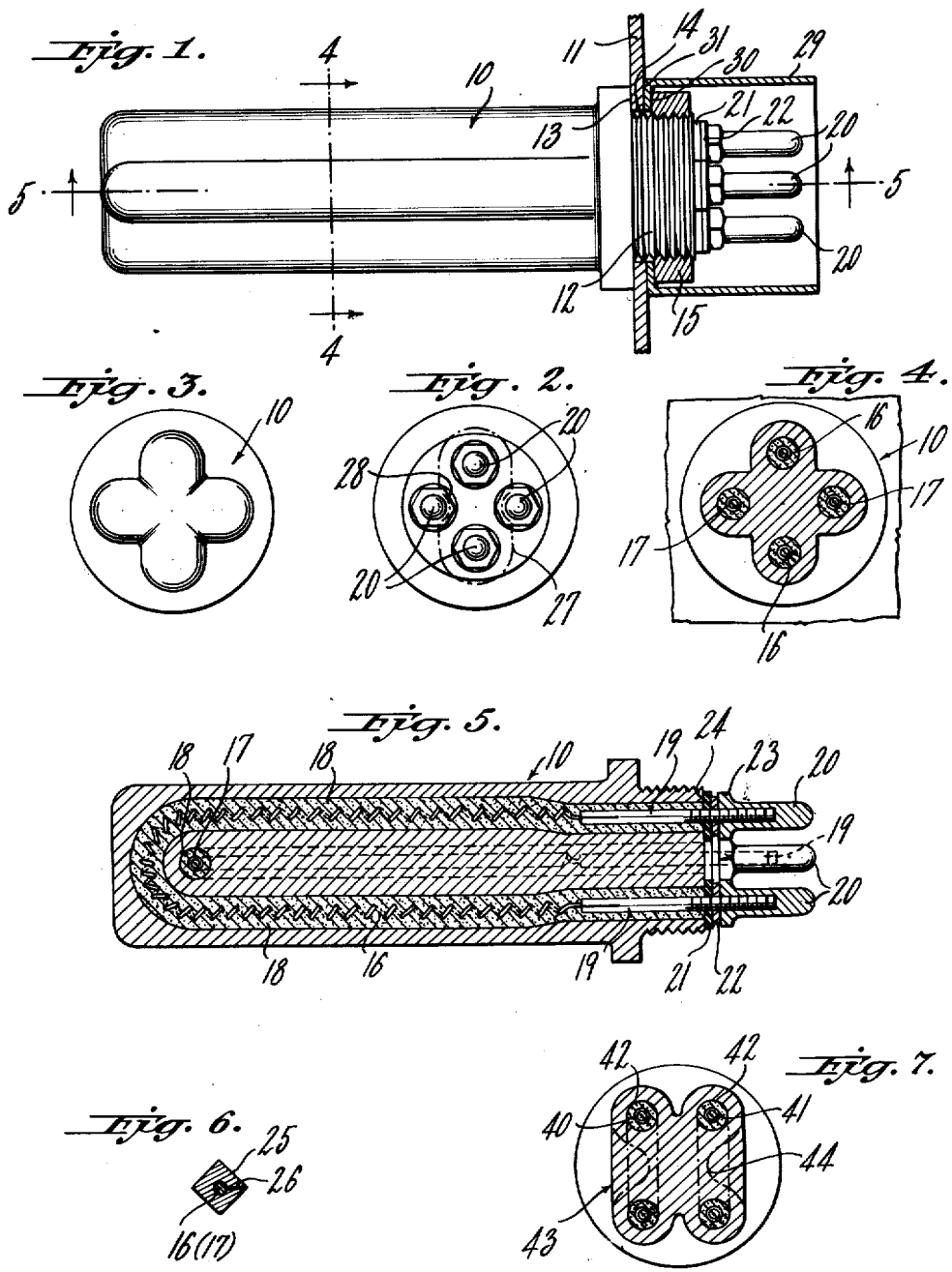

Patented Feb. 9, 1943

2,310,325

UNITED STATES PATENT OFFICE 2,310,325

ELECTRICAL HEATING UNIT

John E. Smith, Plainfield, N. J.

Application December 30, 1937, Serial No. 182,531

5 Claims. (Cl. 201—67)

This invention relates to electrical heating units of the immersion type adapted for installation in various kinds of vessels for heating the fluid contents thereof.

According to one of the features of this invention, a wire filament is contained in intimate contact with a covering of ceramic material forming a heating element which is cast within a metallic casing preferably of aluminum or other suitable material having high thermal conductivity.

In former practice heating elements of this type and casing therefor were assembled by inserting the filaments in pre-formed openings in the casing, whereas in the present invention the metallic casing is cast around the heating elements firmly embedding them in the metal, and thus bringing the ceramic coverings into intimate contact with the casing by reason of shrinkage of the metal against the ceramic coverings and the compacting effect resulting from the high pressure produced by such shrinkage. Previously to the casting operation the ceramic material is applied to the filament in plastic form and baked thereon. Thus more rapid transfer of heat is secured from the wire filament to the metallic casing through which it is conducted to the fluid contents of the vessel. These features contributing to rapid heat transfer have the advantage of enabling the filament to be operated at a relatively low temperature, so that the heating unit has a longer life. It has been found in practice that the filament thus encased need not be worked at a temperature sufficient to cause it to reach red heat in service.

Another feature contributing to rapid heat transfer is the construction of the metal casing which is as thin as can be conveniently cast around the ceramic coverings of the heating filaments.

All of the above features combine to enable the immersed heating element to operate at higher electrical densities per square inch of heating surface than prior types of elements, while at the same time permitting the filament itself to be worked at a comparatively low temperature.

According to another feature of this invention, the heating unit is provided with two elements, preferably of different resistance values, whereby the heating unit provides two different heats; although the separate elements may have the same relative values.

According to still another feature of the invention, the heating element is provided with two sets of terminal pins for connection to a service plug, the arrangement of the pins being such that it is not possible to plug in on one terminal of each of two heating filaments contained within the heating element. Also, the arrangement of the terminal pins may be such as to enable the use of a special type of plug having clearance grooves to accommodate terminal pins of another filament not in service.

Usually, according to this invention, when two heating filaments are used in one heating element the respective filaments and terminal pins are disposed at right angles, but the two filaments and their terminal pins might be disposed in parallel side by side relation. The invention is not limited to the use of terminal pins or any particular arrangement thereof, as in some cases such pins may be dispensed with, and connections made directly to the heating filaments in any appropriate manner to meet the requirements of any particular installation.

A further feature in connection with the use of multiple heating filaments is an arrangement of terminal pins so that the usual shape of guard may be used giving protection for the pins and allowing the necessary clearance for use of the standard service plug for connection to the source of power.

Another feature of advantage is that this heating device is a self-contained unit which can be readily attached to any heating vessel by merely providing the necessary opening for its installation.

Various other features and advantages of the invention will appear as the description proceeds, reference being made to the accompanying drawings forming a part of this specification, and in which:

Figure 1 is a side view partly in section of a heating unit according to my invention shown installed in the wall of a vessel, Fig. 2 is an end view of the terminal portion of the unit, Fig. 3 a view of the opposite end of the unit, Fig. 4 a cross-section on the line 4—4 of Fig. 1, Fig. 5 a longitudinal section on the line 5—5 of Fig. 1, Fig. 6 an enlarged cross-sectional detail of a connection of the heating filament to a terminal pin, Fig. 7 a cross-section illustrating parallel arrangement of two heating filaments.

Fig. 8 an end view of the terminal portion of a two filament heating unit having a modified form of guard, Fig. 9 is a fragmentary cross-section taken on the line 9—9 of Fig. 8, Fig. 10 is an end view of the terminal portion of a single filament heating unit and a further modified guard, and Fig. 11 a fragmentary cross-section on the line 11—11 of Fig. 10.

Referring to the drawings, the reference numeral 10 indicates a metallic casing preferably of cast aluminum, since this material has been found to possess the requisite thermal conductivity to effect rapid transfer of heat through its walls.

The heating unit is adapted to be mounted in the wall 11 of a fluid-containing tank or other vessel so that the casing 10 will be immersed. For this purpose the casing 10 may be reduced and threaded at one end as indicated at 12 and provided with a shoulder 13, the reduced portion 12 projecting through an opening 14 in the wall 11 and tightened by a nut 15 so as to draw the shoulder firmly against the inner face of the wall 11, providing a fluid tight connection and holding the heating unit rigidly in operating position within the tank.

Two heating filaments 16 and 17 formed of suitable coiled resistance wire are embedded in ceramic or other appropriate electrical insulating material 18 which fills the coils and surrounds and embeds them throughout their length so as to provide heat-conducting and electrical insulating coverings between the filaments 16 and 17 and the body of the metallic casing 10.

The ends of each of the filaments 16 and 17 are provided with terminal screws 19 which project beyond the threaded end 12 of the casing 10 for receiving the screw threaded terminal pins 20 which are tightened against insulating pieces 21 and washers 22 between the flanges 23 of the pins 20 and the outer face 24 of the threaded end 12 of the casing.

Preferably the encased ends of the terminal screws 19 are squared as shown at 25 in Fig. 6, and slotted at 26 to receive the ends of the wire filaments 16 and 17, after which the slotted portions are swaged together to clamp the filaments tightly to the terminal screws.

In the manufacture of the present heating units the wire filaments and their terminal screws embedded in the ceramic material 18, are suitably held in position so as to dispose the filaments at right angles to each other (Figs. 4 and 5), and the metal of the casing 10 is then cast therearound by an appropriate molding operation. A very tight contact is obtained between the metallic body of the casing and the ceramic material surrounding the heating filaments, resulting from shrinkage of the metal in solidifying around the ceramic material. The metal of the casing 10 may be of the contour shown in Figs. 1, 3 and 4, substantially cross shaped in transverse section, and the walls should be as thin as can be conveniently cast so as not to impede rapid transfer of heat from the filaments 16 and 17 and through the casing to the fluid to be heated.

The enclosed filaments 16 and 17 may be designed for different wattages to provide for a low and a high heat in the one unit, or both of the filaments may be of the same wattage, providing a reserve filament in case one is burned out in use. In either case the filaments may be conveniently supplied with current through the medium of a service plug. For this purpose, the terminal pins 20 are disposed at right angles to each other in the form shown in Fig. 2, and spaced apart to accommodate the standard service plug such as that indicated by dot and dash lines at 27 in Fig. 2.

Here the plug is shown as supplying current to the filament 16, whereas the pins connected to the filaments 17 are out of use at opposite sides of the plug in clearance grooves 28 thereof. Obviously, the plug 27 may be connected to the other two terminals, serving the filament 17, by turning the plug at right angles to the position illustrated in Fig. 2, but it will be noted that the arrangement of the pins 20 and the distances between the centers thereof is such that it is not possible to plug in on one terminal of each of the two elements 16 and 17.

The arrangement of the terminal pins 20 as employed herein enables the usual terminal guard to be used. Such a guard is shown at 29 in Fig. 1, as being provided with an inturned flange 30 to be clamped by the nut 15 against the outer face 31 of the vessel wall 11, thereby holding the guard rigidly in place and permitting easy insertion and adjustment of the plug 27 for connection to the respective pairs of pins 20.

A modified form of heating element is disclosed in Fig. 7, this being an illustration of the manner in which two heating filaments may be disposed in parallel side by side relation within the body of the casing. In this example of the invention the two filaments are designated 40 and 41, the ceramic material 42, and the metallic casing 43. The sides of the casing may be formed with grooves as shown at 44 to reduce the wall thickness adjacent the heating filaments.

In Figs. 8 and 9 there is shown a combined guard and clamping nut 50. The nut portion 51 is threaded at 52 for reception on the threaded and reduced part 53 of the metallic casing 54, and is tightened directly against the outer wall of the tank 11. The guard portion 55 extends outward as an integral part of the nut portion 51 so as to encompass the terminal pins 56 and gives the necessary accessibility for a service plug.

If desired, the two heating filaments may be utilized for simultaneous operation by connecting the terminal pins 56 together as shown at 57 in Fig. 8. By thus bridging these terminal pins the two filaments within the casing will be connected in multiple and fed at the same time by the service plug when connected to either part of the terminal pins 56.

Figs. 10 and 11 illustrate a further modification in which a heating unit casing 60 is provided with a pair of screw-threaded lugs 61 formed about the filament ends (not shown) and adapted to project through openings 62 in the tank wall 11. Nuts 63 on the lugs 61 draw the end 64 of the casing tightly against the inner surface 65 of the tank wall 11. A guard piece 66 having a flange portion 67 and openings 68 for the lugs 61, is clamped between the nuts 63 and the outer face 69 of the wall 11 providing a rigid connection between all the parts. A pair of terminal pins 70 project outwardly from the lugs 61 for connection to the usual service plug. Any suitable form of terminals may be substituted for the pins.

In conclusion, it is to be understood that the invention is capable of various other forms of construction and modifications, and is therefore not to be limited in its applications except as defined in the appended claims.

I claim:

1. A heating unit of the immersion type for connection to a heating vessel, comprising a pair of resistance element sections embedded in electrical insulating material, terminal posts connected to the ends of the element sections, said posts having flattened portions embedded in said insulating material and protruding screw-threaded portions, a metallic casing cast around said insulating material, terminal pins carried by the protruding portions of said posts, and insulation between said terminal pins and the adjacent portions of the casing.

2. A heating unit of the immersion type for connection to a heating vessel, comprising a pair of separate heating filaments embedded in electrical insulating material and having protruding ends, the filaments being arranged in planes perpendicular to each other with the protruding ends adjacent each other, a metallic casing cast around said insulating material, and pairs of terminal posts connected to the protruding end of the filaments respectively, said casing having a shoulder and a reduced and threaded portion at the terminal end of the unit, said threaded portion extending through an opening in the vessel wall, a nut on the threaded extension, and a guard surrounding the terminal posts and having a flange between the nut and the outside wall of the vessel, said nut being tightened against said flange to hold the shoulder against the interior face of the vessel wall and the flange against the outside face of said wall.

3. A heating unit comprising two heating elements of different values and each arranged in a loop-shaped core of ceramic material, the cores being disposed in planes perpendicular to each other, a thin-walled cast aluminum casing surrounding the heating elements to form a heating unit substantially in the shape of a cross in cross-section with the cores respectively embedded in the opposite arms of said casing.

4. In a heating unit a heating element formed of a coil of wire, terminal pins having squared inner ends with slots therein for respectively receiving the ends of the wire and outer screw threaded ends, ceramic material surrounding and embedding said wire and the squared and slotted ends of the pins, and a thin-walled cast aluminum casing surrounding the ceramic material.

5. An electrical heating element comprising a pair of separate cores each having a resistance wire filament embedded in electrical insulation material and having terminal members secured to the ends of said filaments and protruding from the insulation material, the cores being formed to be substantially loop-shaped and disposed in planes substantially perpendicular to each other with the protruding terminal members thereof adjacent each other; a thermally conductive body having a cruciform portion with said cores respectively embedded in the opposite arms thereof except for the protruding portions of said terminal members, said body also having a round portion adjacent said terminal pins which is screw threaded, and a nut cooperating with said screw threaded portion.

JOHN E. SMITH.